No. 680,392. Patented Aug. 13, 1901.
H. A. PALMER.
MEANS FOR SECURING RESILIENT TIRES TO VEHICLE WHEELS.
(Application filed Mar. 15, 1901.)
(No Model.)
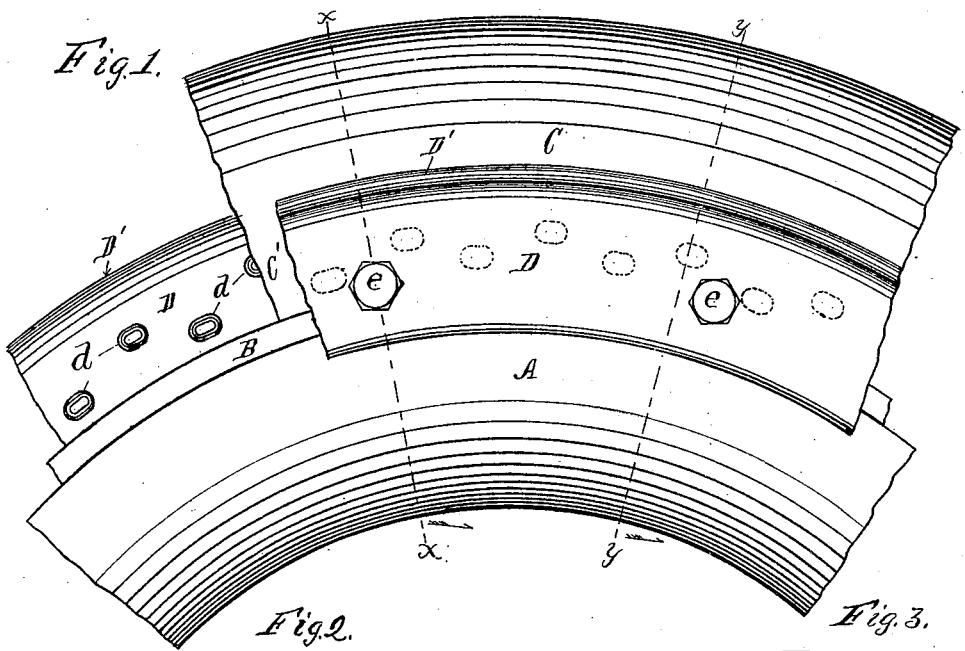
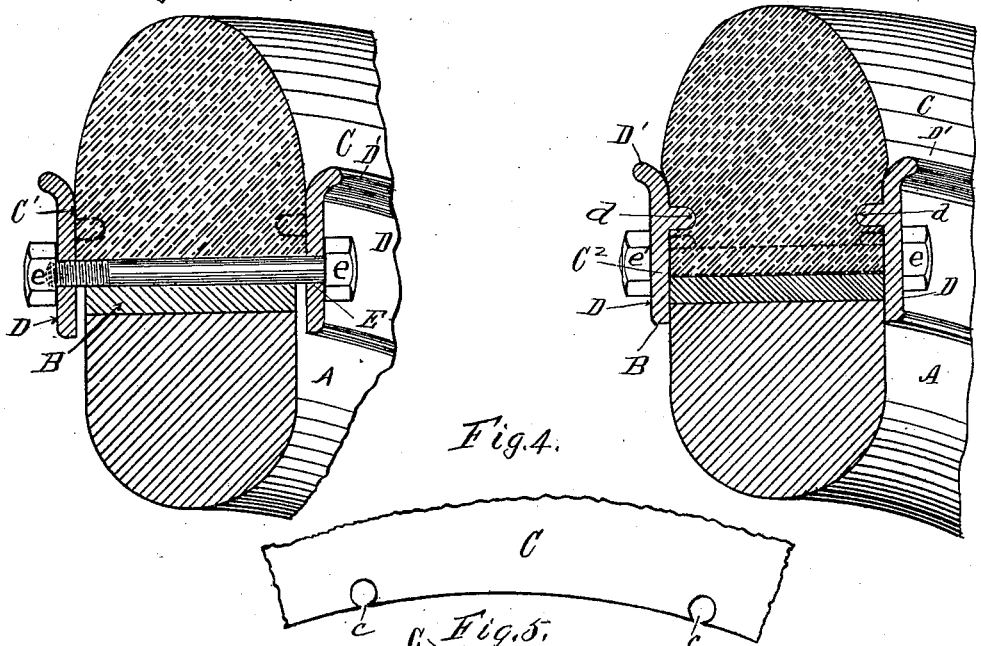
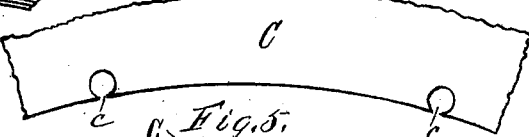
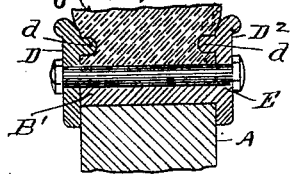
Witnesses.
Inventor.
Harry A Palmer

UNITED STATES PATENT OFFICE.

HARRY A. PALMER, OF ERIE, PENNSYLVANIA.

MEANS FOR SECURING RESILIENT TIRES TO VEHICLE-WHEELS.

SPECIFICATION forming part of Letters Patent No. 680,392, dated August 13, 1901.

Application filed March 15, 1901. Serial No. 51,366. (No model.)

*To all whom it may concern:*

Be it known that I, HARRY A. PALMER, a citizen of the United States, residing at Erie, in the county of Erie and State of Pennsylvania, have invented certain new and useful Improvements in Means for Securing Resilient Tires to Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to means for securing resilient tires to vehicle-wheels provided with metal tires thereon; and it consists, substantially, in making the inner portion of the resilient tire somewhat wider than the metal tire of the wheel and with its interior surface flat and with transverse grooves or openings therein, through which bolts can be passed when the resilient tire is secured upon a wheel. This I do by means of annular flanges provided on their inner surfaces with lugs which engage each side of the resilient tire. These flanges extend inwardly sufficiently to overlap the metal tire and also a portion of the wheel-rim when they are in place thereon. These flanges are secured to the wheel by means of bolts passing through the flanges and the grooves or openings in the resilient tire, which bolts when screwed up operate to press the lugs on the annular rims into each side of the resilient tire and also to compress the inner portion of the resilient tire to the same width as the metal tire on the wheel-rim, against which, as well as against the wheel-rim, said flanges firmly seat, which operates to firmly secure and retain the resilient tire in place on the wheel.

These and other features of my invention are hereinafter set forth and described, and illustrated in the accompanying drawings, in which—

Figure 1 shows sections of the resilient tire, the annular flanges, the metal tire, and the wooden rim when the resilient tire is in place. Fig. 2 shows a cross section of the same, on the line $x$ $x$ in Fig. 1, before the annular flanges are compressed against the metal tire and the wooden wheel-rim. Fig. 3 shows a cross-section of the same, on the line $y$ $y$ in Fig. 1, after the annular flanges are screwed up against the metal tire and the wheel-rim. Fig. 4 is a view in elevation of a section of the resilient tire, showing the grooves or openings in its interior surface. Fig. 5 shows a transverse section of a modified form of my invention.

In the drawings thus illustrating my invention, A is the wooden wheel-rim, and B the metal tire thereon, both of which are preferably of the usual construction.

C is a resilient tire, made of rubber or other resilient substance, with the inner portions C' thereof wider than the metal tire B, as shown in Fig. 2, and with its interior surface C² flat, so as to contact with the flat periphery of the metal tire B. Transverse grooves or openings $c$ are also made in the inner portion C' of the tire, preferably opening through the interior surface thereof, as clearly shown in Fig. 4. The annular flanges D are made in continuous rings, the peripheries D' of which curve outward, as illustrated in Figs. 2 and 3. On the portion of the inner faces of the flanges D extending beyond the metal tire D' there are two or more rows of inwardly-projecting lugs $d$. These lugs $d$ are preferably made of considerably-greater width annularly than radially and have their outer ends rounded, so that when they are forced into the sides of a resilient tire C they will not cut or tear the resilient tire, but will simply press back the resilient substance until they embed themselves therein. These lugs $d$ may be made of such annular width and at such distances apart as may be desired. In the drawings I have shown two rows of lugs $d$ on the annular flanges D, the flanges $d$ in one row being intermediate to those in the other row. I can, however, use more than two rows of lugs $d$ and locate them on the flanges D, as may be desired. At intervals corresponding with the slots or openings $c$ in the resilient tire C, I make bolt-holes $d'$ in the flanges D, in which bolts E, preferably provided with heads $e$ and nuts $e'$, are inserted, which when screwed up press the lugs $d$ on the flanges D into the sides of the inner portion C' of the resilient tire C and also compress that portion of the tire C to the same width as the metal tire B, thus seating the flanges D D firmly against the edges of the metal tire B and sides of the wheel-rim A and firmly securing the resilient tire C in place on the wheel. In the drawings and description thereof I have located the bolts E immediately adjacent to the periphery of the metal tire B. They can, however, be located somewhat above the periphery of the metal tire or can be inserted through holes made in the rim of the wheel inside of the metal tire. I, however, prefer the construction hereinbefore described, as I believe I secure the best results therewith.

In Fig. 5 I show a modified construction of my invention, in which the metal tire B' is made with a flange $D^2$ thereon, and the other flange D is made removable, as hereinbefore described. Both of these flanges have the inwardly-projecting lugs $d$ on their inner faces, as hereinbefore described. The resilient tire C being made wider than the annular face of the metal tire B', as hereinbefore described, can in like manner be compressed between the permanent flange $D^2$ on the metal tire B' and the removable flange D on the opposite side of the tire with the same results as hereinbefore described.

Therefore, having described my invention so as to enable others to construct and use the same, what I claim as new, and desire to secure by Letters Patent of the United States, is—

1. The combination with a vehicle-wheel, of a flat metal tire, a resilient tire having its inner surface wider than the metal tire, annular flanges adapted to be brought into contact with the resilent tire and compress it until the flanges contact with the sides of the wheel-rim and the metal tire, two or more rows of obtuse inwardly-projecting lugs on the portions of the flanges contacting with the sides of the resilient tire, and bolts passing through said flanges, substantially as and for the purpose set forth.

2. The combination with a wheel having a metal tire, of a resilient tire having its inner portion wider than the peripheral face of the metal tire, annular flanges adapted to fit against the sides of the resilient tire and compress it to the same width as the peripheral face of the metal tire, two or more rows of inwardly-projecting lugs extending entirely around the inner faces of said annular flanges having the outer ends thereof rounded and adapted to be pressed into the sides of the resilient tire, and bolts passing through said annular flanges adjacent to the periphery of the metal tire, substantially as and for the purpose set forth.

In testimony whereof I affix my signature in presence of two witnesses.

HARRY A. PALMER.

Witnesses:
H. M. STURGEON,
T. N. PALMER.